(12) United States Patent
Murakami et al.

(10) Patent No.: US 10,960,787 B2
(45) Date of Patent: Mar. 30, 2021

(54) SEAT SLIDE DEVICE

(71) Applicant: SHIROKI CORPORATION, Fujisawa (JP)

(72) Inventors: Yuta Murakami, Nagoya (JP);
Toshiaki Nagata, Aichi-ken (JP);
Koichi Morita, Kariya (JP)

(73) Assignee: SHIROKI CORPORATION, Fujisawa (JP)

( * ) Notice: Subject to any disclaimer, the term of this patent is extended or adjusted under 35 U.S.C. 154(b) by 0 days.

(21) Appl. No.: 16/681,123

(22) Filed: Nov. 12, 2019

(65) Prior Publication Data
US 2020/0156510 A1 May 21, 2020

(30) Foreign Application Priority Data
Nov. 16, 2018 (JP) .............................. JP2018-215477

(51) Int. Cl.
*B60N 2/00* (2006.01)
*B60N 2/07* (2006.01)

(52) U.S. Cl.
CPC .................................. *B60N 2/0722* (2013.01)

(58) Field of Classification Search
CPC ........ B60N 2/0715; B60N 2/06; B60N 2/067; B60N 2/07; B60N 2/0702
USPC ........................................ 248/424, 429, 430
See application file for complete search history.

(56) References Cited

U.S. PATENT DOCUMENTS

| | | | | |
|---|---|---|---|---|
| 8,226,063 B2* | 7/2012 | Weber | ............... | B60N 2/0705 248/429 |
| 2004/0012236 A1* | 1/2004 | Mallard | ............... | B60N 2/0232 297/344.1 |
| 2006/0186687 A1* | 8/2006 | Kimura | ............... | B60N 2/0232 296/65.13 |
| 2006/0237987 A1* | 10/2006 | Nakamura | ............ | B60N 2/067 296/65.13 |
| 2007/0096494 A1* | 5/2007 | Hofschulte | ......... | B60N 2/0705 296/65.01 |
| 2016/0059740 A1 | 3/2016 | Shimizu et al. | | |
| 2016/0075259 A1* | 3/2016 | Couasnon | ............ | B60N 2/0705 297/344.1 |
| 2018/0304777 A1* | 10/2018 | Ito | ............... | B60N 2/067 |

FOREIGN PATENT DOCUMENTS

JP 2016049804 A 4/2016

* cited by examiner

*Primary Examiner* — Steven M Marsh
(74) *Attorney, Agent, or Firm* — Buchanan, Ingersoll & Rooney PC

(57) ABSTRACT

A slide device includes a lower rail; an upper rail disposed movably with respect to the lower rail; a screw provided on one of the lower rail and the upper rail; and a nut provided on the other one of the lower rail and the upper rail, and engaging the screw, wherein: the upper rail moves relatively with respect to the lower rail in accordance with rotation of at least one of the screw and the nut; the lower rail includes a bottom wall, a side wall extending upward from the bottom wall, and an upper wall extending toward the center in a width direction from the side wall; and the screw or the nut provided on the lower rail has a central axis line which is disposed in a space enclosed by the bottom wall, the side wall, and the upper wall of the lower rail.

6 Claims, 10 Drawing Sheets

SEAT SLIDE DEVICE

CROSS-REFERENCE TO RELATED APPLICATION

This application claims priority from Japanese Patent Application No. 2018-215477 filed with the Japan Patent Office on Nov. 16, 2018, the entire content of which is hereby incorporated by reference

BACKGROUND

1. Technical Field

An embodiment of the present disclosure relates to a slide device in which upper rails slide with respect to lower rails.

2. Related Art

There has been known a technique regarding a seat slide apparatus which is disclosed, as an example, in JP-A-2016-49804.

The seat slide apparatus is provided with a pair of slide devices. The upper rails are moved with respect to the lower rails using the power of a motor. The lower rails are fitted with screws. The screws are fixed to the bottom walls of the lower rails. The screws are each arranged between a pair of upper walls as viewed from above.

SUMMARY

A slide device includes a lower rail; an upper rail disposed movably with respect to the lower rail; a screw provided on one of the lower rail and the upper rail; and a nut provided on the other one of the lower rail and the upper rail, and engaging the screw, wherein: the upper rail moves relatively with respect to the lower rail in accordance with rotation of at least one of the screw and the nut; the lower rail includes a bottom wall, a side wall extending upward from the bottom wall, and an upper wall extending toward the center in a width direction from the side wall; and the screw or the nut provided on the lower rail has a central axis line which is disposed in a space enclosed by the bottom wall, the side wall, and the upper wall of the lower rail.

DETAILED DESCRIPTION

Figure 1:
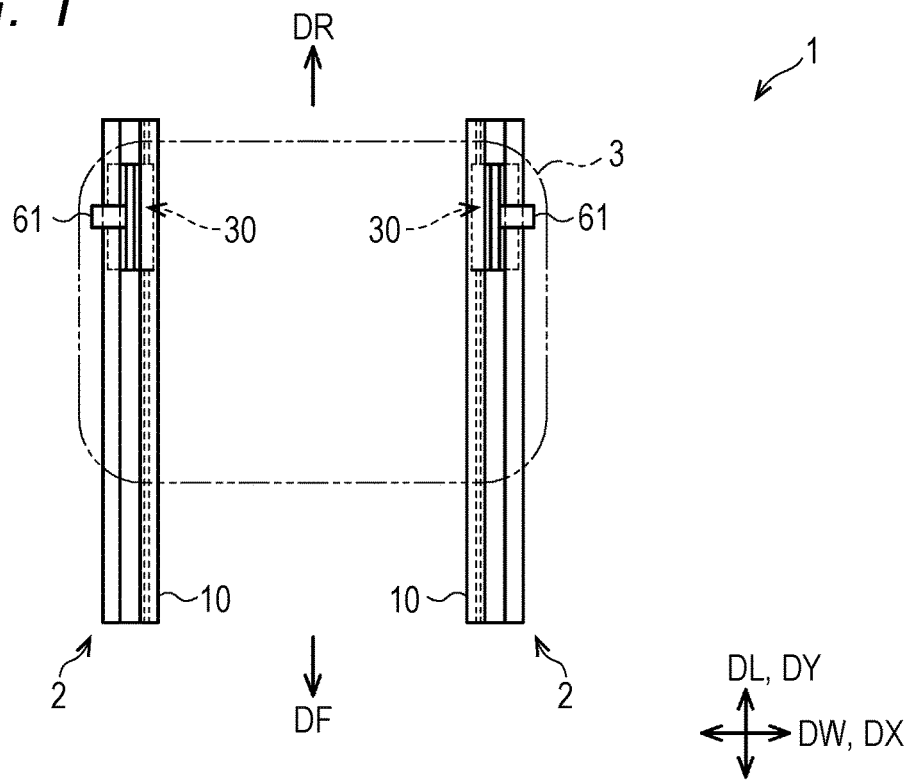
FIG. 1 is a schematic view of a seat slide apparatus.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Various components are attached to the slide device. Examples include screws, fixing members for fixing the lower rails, upper rail stoppers, and blocking walls for suppressing the entry of objects into the lower rails. Due to increased functionality of the slide device, there is an increasing trend in the number of such components. Meanwhile, the dimensions of the lower rails are limited because they are mounted on a vehicle. Accordingly, there is not much space for arranging components in the lower rails. In view of this situation, it is preferable to be able to fully utilize the limited space in the lower rails. Thus, an object of the present disclosure is to provide a slide device which increases the freedom of arrangement of components in the lower rails.

A slide device (the present slide device) according to an aspect of the present disclosure includes a lower rail; an upper rail disposed movably with respect to the lower rail; a screw provided on one of the lower rail and the upper rail; and a nut provided on the other one of the lower rail and the upper rail, and engaging the screw, wherein: the upper rail moves relatively with respect to the lower rail in accordance with rotation of at least one of the screw and the nut; the lower rail includes a bottom wall, a side wall extending upward from the bottom wall, and an upper wall extending toward the center in a width direction from the side wall; and the screw or the nut provided on the lower rail has a central axis line which is disposed in a space enclosed by the bottom wall, the side wall, and the upper wall of the lower rail.

According to the present slide device, the central axis line of the screw or the nut provided on the lower rail is disposed in the space enclosed by the bottom wall, the side wall, and the upper wall. Thus, the screw or nut that is provided on the lower rail can be provided on any of the bottom wall, the side wall, and the upper wall. Accordingly, the freedom of attachment of the screw or nut provided on the lower rail is increased. As a result, the freedom of arrangement of components other than the screw and the nut is also increased. Thus, according to the present slide device, compared to a structure in which the attachment position of the screw is substantially determined, the freedom of arrangement of components can be increased.

(2) In the present slide device, the screw may be provided on the lower rail, and the nut may be provided on the upper rail. In this configuration, it is possible to make the upper rail shorter than in a structure in which the screw is attached to the upper rail.

(3) In the present slide device, the screw may be attached to the side wall of the lower rail. In this configuration, a screw attachment portion for attaching the screw is provided on the side wall. Accordingly, the design freedom of the bottom wall is increased. For example, compared to a case in which the attachment member for attaching the screw is provided on the bottom wall, it is possible to increase the number of fastening members attached to the bottom wall.

(4) In the present slide device, the screw may be passed through the nut, and the nut and a gear meshing with the nut on the outside of the nut may be arranged in the width direction. In this configuration, because the nut and the gear are arranged in the width direction, it is possible to reduce the dimension of the present slide device in the vertical direction.

(5) In the present slide device, the screw may be provided on the lower rail, the nut may be provided on the upper rail, the nut and the gear may be arranged in a case, and the case may be attached to the upper rail. In this configuration, the position of the case is stabilized, and therefore the sliding of the upper rail is stabilized.

(6) The present slide device may further include a buffer member arranged between the case and the upper rail. In this way, vibration of the case due to movement of the upper rail in the front-rear direction is absorbed by the buffer member. Accordingly, generation of noise is made less likely to occur.

The present slide device has a structure that makes it possible to increase the freedom of arrangement of components in the lower rail.

Referring to FIG. 1 to FIG. 15, a slide device 2 according to an embodiment of the present disclosure will be described. The slide device 2 is a constituent element of a seat slide apparatus 1. The seat slide apparatus 1 supports a seat 3 of a vehicle in a slidable manner. The seat 3 is mounted on the seat slide apparatus 1.

As illustrated in FIG. 1, the seat slide apparatus 1 includes a pair of slide devices 2. The pair of slide devices 2 are arranged in a vehicle width direction on the vehicle floor. The slide devices 2 are fixed to the vehicle floor with a longitudinal direction DL of the slide devices 2 aligned with the vehicle front-rear direction. In FIG. 1, in the sheet of the drawing, the bottom corresponds to the front DF, and the top corresponds to the rear DR.

Figure 2:
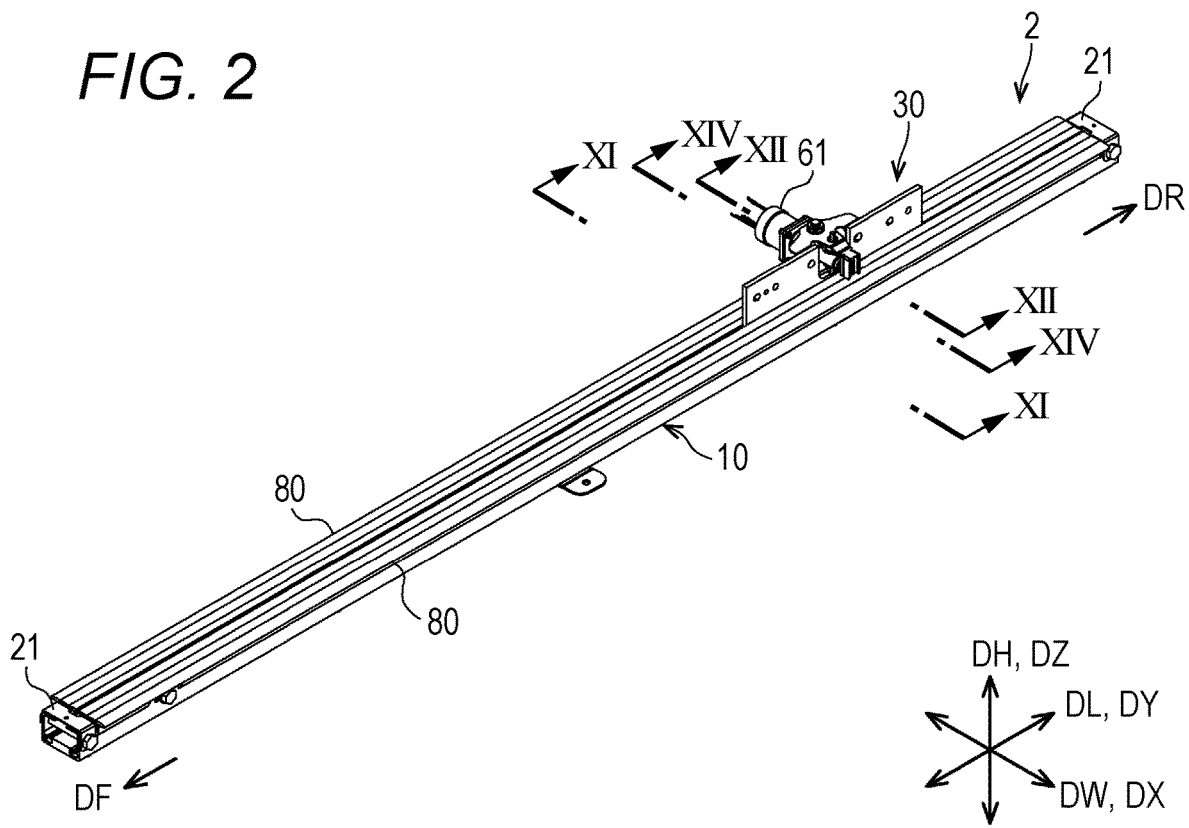
FIG. 2 is a perspective view of a slide device.
Figure 3:
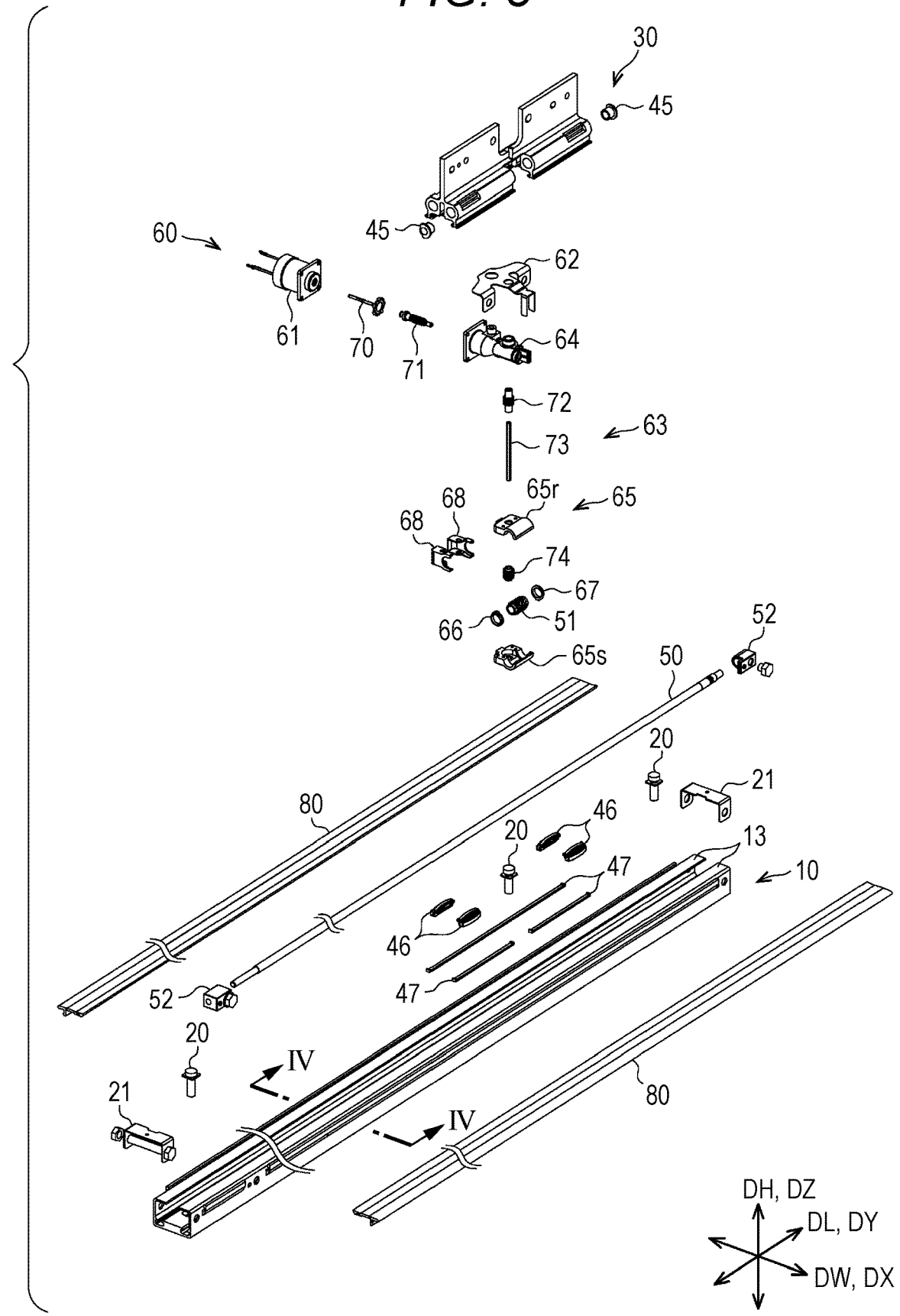
FIG. 3 is an exploded perspective view of the slide device.

As illustrated in FIG. 2 and FIG. 3, the slide device 2 includes: a lower rail 10; an upper rail 30 disposed movably with respect to the lower rail 10; a screw 50; and a nut 51. The screw 50 is provided on one of the lower rail 10 and the upper rail 30. The nut 51 is provided on the other one of the lower rail 10 and the upper rail 30. Herein, "provided" may include "attached" and "retained". In the present embodiment, "attached" indicates something being attached in a substantially non-rotatable manner; "retained" indicates something being retained in a rotatable manner.

The upper rail 30 moves relatively with respect to the lower rail 10 in accordance with rotation of at least one of the screw 50 and the nut 51.

In the present embodiment, the screw 50 is attached to the lower rail 10. The nut 51 is retained by the upper rail 30 so as to engage the screw 50 in a rotatable manner. The nut 51 moves with respect to the screw 50 in a direction along a central axis line CA of the screw 50, as the nut 51 itself rotates. Thus, the upper rail 30, together with the nut 51, moves with respect to the lower rail 10.

Preferably, the slide device 2 further includes a drive device 60. The drive device 60 transmits power to the nut 51. The drive device 60, by transmitting power to the nut 51, causes the upper rail 30 to move with respect to the lower rail 10.

Further preferably, the slide device 2 includes a pair of cover members 80. The cover members 80 are disposed over upper walls 13 of the lower rail 10. The cover members 80 cover gaps SA between the lower rail 10 and the upper rail 30 (see FIG. 11). The cover members 80 may include resin, rubber, and a composite member of resin and rubber.

Referring to FIG. 2 to FIG. 15, an example of the slide device 2 will be described. In the following description, with respect to the lower rail 10, in a state in which the lower rail 10 is fixed to the vehicle, the direction along the vehicle width direction will be referred to as a "width direction DW", and the direction perpendicular to the longitudinal direction DL of the lower rail 10 and perpendicular to the width direction DW of the lower rail 10 as a "vertical direction DH". The moving direction of the upper rail 30 corresponds to the longitudinal direction DL of the lower rail 10.

Figure 4:
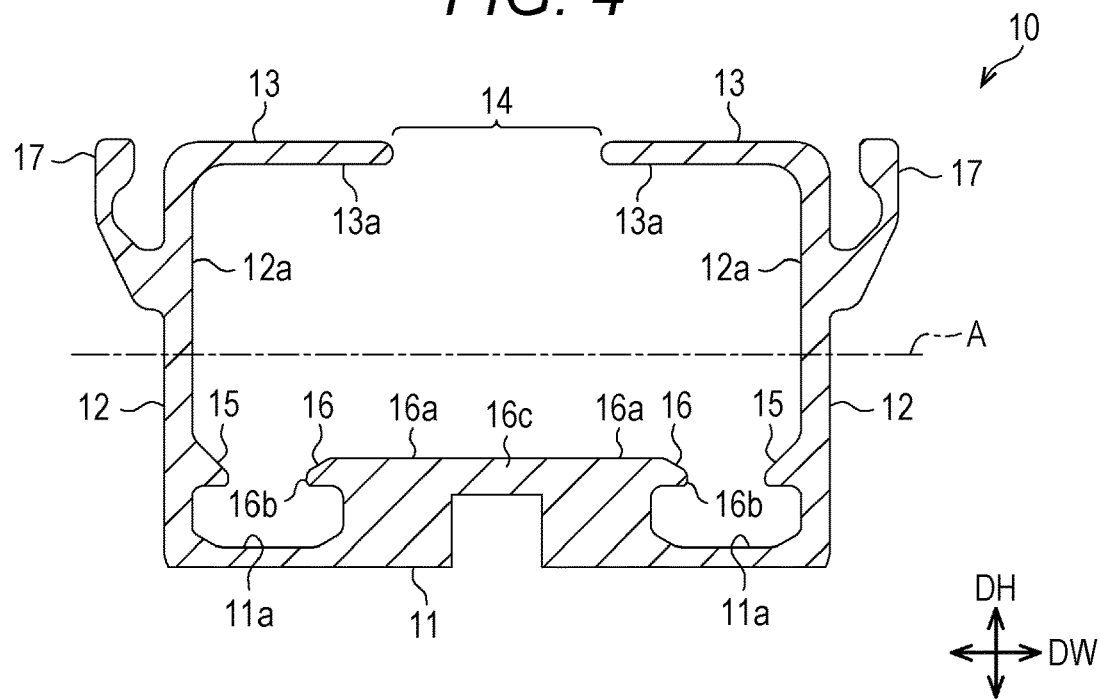
FIG. 4 is a cross-sectional view of a lower rail taken along line IV-IV of FIG. 3.

Referring to FIG. 3 and FIG. 4, the lower rail 10 will be described.

The lower rail 10 is fixed to the vehicle floor by fastening members 20. The lower rail 10 includes: a bottom wall 11; a pair of side walls 12 spaced apart in the width direction DW on the bottom wall 11; and an upper wall 13 provided on at least one of the pair of side walls 12, 12. For example, the side walls 12 respectively extend upward from both ends in the width direction DW of the bottom wall 11. The upper wall 13 is provided on each of the side walls 12. A pair of upper walls 13 extend from the respective upper ends of the side walls 12 in directions to approach each other (toward the center in the width direction DW).

A communicating portion 14 is provided between the upper walls 13, providing communication between the inside and outside of the lower rail 10. The communicating portion 14 extends along the longitudinal direction DL of the lower rail 10.

The side walls 12 have first regulating portions 15 regulating upward movement of the upper rail 30. The first regulating portions 15 protrude from inner surfaces at lower portions of the side wall 12 toward the center in the width direction DW. The first regulating portions 15 extend along the longitudinal direction DL of the lower rail 10.

The first regulating portions 15 are provided lower than the center (a dashed and single-dotted line A in FIG. 4) in the vertical direction DH of the side walls 12. As the first regulating portions 15 engage the upper rail 30, upward movement of the upper rail 30 is regulated. Specifically, as the lower ends of the first regulating portions 15 abut against the upper ends of first protrusions 35c of the upper rail 30, as will be described later, upward movement of the upper rail 30 is regulated. Herein, "provided lower than the center (a dashed and single-dotted line A in FIG. 4) in the vertical direction DH of the side walls 12" means that at least a part of the first regulating portions 15 is positioned lower than the center (the dashed and single-dotted line A in FIG. 4) in the vertical direction DH of the side wall 12. Preferably, at least the lower ends of the first regulating portions 15 are positioned lower than the center in the vertical direction DH of the side walls 12. More preferably, the first regulating portions 15 are entirely positioned lower than the center in the vertical direction DH of the side wall 12.

The side walls 12 have first sliding-contact surfaces 12a. The first sliding-contact surfaces 12a are surfaces that slide members 46 of the upper rail 30 contact. The first sliding-contact surfaces 12a extend along the longitudinal direction DL of the lower rail 10. The first sliding-contact surfaces 12a are disposed higher than the first regulating portions 15.

Joint members 21 joined to the pair of side walls 12 are provided at both ends in the longitudinal direction DL of the lower rail 10 (see FIG. 2).

The bottom wall 11 have second regulating portions 16 regulating upward movement of the upper rail 30. The second regulating portions 16 extend along the longitudinal direction DL of the lower rail 10. In the present embodiment, the bottom wall 11 has two second regulating portions 16. The two second regulating portions 16 are arranged in the width direction DW and are connected to each other.

The second regulating portions 16 include two extension walls 16a, claws 16b, and a connecting wall 16c. The two extension walls 16a extend upward in the vertical direction DH from the center in the width direction DW of the bottom wall 11. The claws 16b protrude outward from the upper ends of the extension walls 16a in the width direction DW. The connecting wall 16c connects the upper ends of the extension walls 16a. The position of the claws 16b in the vertical direction DH is configured to be substantially the same as the position of the first regulating portions 15 in the vertical direction DH. As the second regulating portions 16 engage the upper rail 30, upward movement of the upper rail 30 is regulated. Specifically, as the lower ends of the claws 16b of the second regulating portions 16 abut against the upper ends of second protrusions 35d of the upper rail 30, as will be described later, upward movement of the upper rail 30 is regulated.

The bottom wall 11 has two second sliding-contact surfaces 11a. The second sliding-contact surfaces 11a are surfaces that lower slide members 47 provided at the lower part of the upper rail 30 contact. The second sliding-contact surfaces 11a are provided between the first regulating portions 15 and the second regulating portions 16. The second sliding-contact surfaces 11a extend along the longitudinal direction DL of the lower rail 10.

The upper walls 13 have third sliding-contact surfaces 13a. The third sliding-contact surfaces 13a are surfaces that the slide members 46 contact. The third sliding-contact surfaces 13a extend along the longitudinal direction DL of the lower rail 10.

Preferably, the lower rail 10 includes retaining portions 17 retaining the cover members 80. Specifically, the retaining portions 17 are provided on the side wall 12. Preferably, in the lower rail 10, the bottom wall 11, the side walls 12, the upper walls 13, the first regulating portions 15, the second regulating portions 16, and the retaining portions 17 are integrally molded. Specifically, the lower rail 10 is formed by subjecting an extruded article of aluminum or aluminum alloy to a cutting process.

Referring to FIG. 5 to FIG. 10, the upper rail 30 will be described.

In the following description, the direction along the moving direction of the upper rail 30 will be referred to as a "front-rear direction DY" of the upper rail 30. In a state in which the upper rail 30 is arranged inside the lower rail 10, the front-rear direction DY of the upper rail 30, the moving direction of the upper rail 30, and the longitudinal direction DL of the lower rail 10 correspond to one another. When the upper rail 30 is arranged inside the lower rail 10, with respect to the upper rail 30, the direction along the width direction DW of the lower rail 10 will be referred to as a "width direction DX", and the direction along the vertical direction DH of the lower rail 10 will be referred to as a "vertical direction DZ".

The upper rail 30 is attached to the lower part of the seat 3. The upper rail 30 is in sliding contact with the lower rail 10. In the present embodiment, the upper rail 30 is in sliding contact with the bottom wall 11 of the lower rail 10. Preferably, the upper rail 30 may be further in sliding contact with the side walls 12 and upper walls 13 of the lower rail 10.

Figure 5:
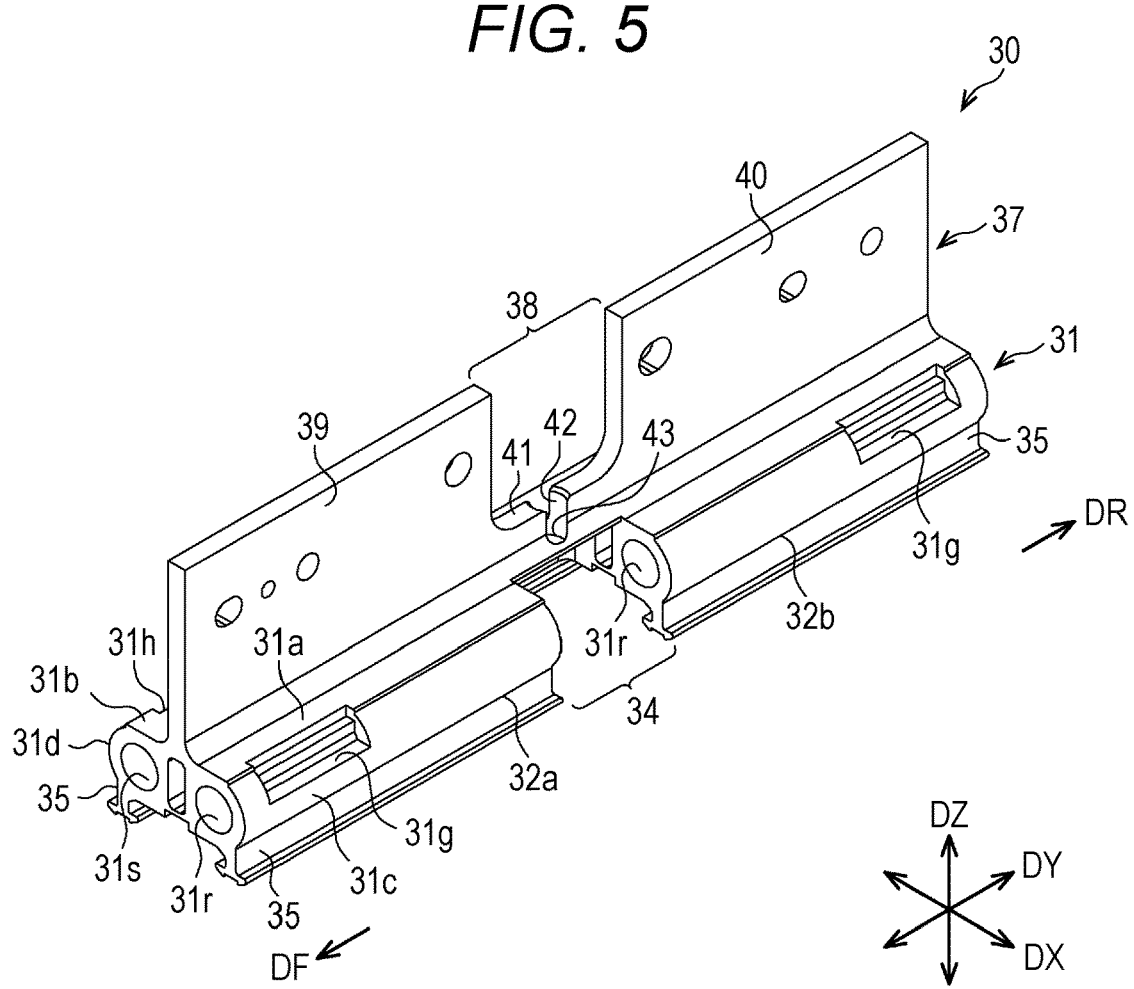
FIG. 5 is a perspective view of an upper rail.

As illustrated in FIG. 5, the upper rail 30 includes: a body portion 31 disposed inside the lower rail 10; a vertical wall portion 37 provided on the body portion 31 and protruding outside the lower rail 10; and support portions 35 supporting the body portion 31. The body portion 31 includes passing holes 31r through which the screw 50 is passed. Preferably, the upper rail 30 has two passing holes 31r arranged along the front-rear direction DY. The two passing holes 31r are disposed with the nut 51 therebetween. Specifically, the passing holes 31r are respectively provided in a front part 32a and a rear part 32b of a first portion 32, which will be described later.

Preferably, the body portion 31 also has a through-hole 31s in addition to the passing holes 31r. The passing holes 31r and the through-hole 31s are disposed side by side in the width direction DX. The through-hole 31s is provided to increase the thickness of the walls constituting the body portion 31. The upper rail 30 has the through-hole 31s extending in the front-rear direction DY. The through-hole 31s is divided into two by a recess 34. Specifically, the through-hole 31s is provided in each of a front part 33a and a rear part 33b of a second portion 33 which will be described later.

The body portion 31 is configured as follows, for example.

Figure 6:
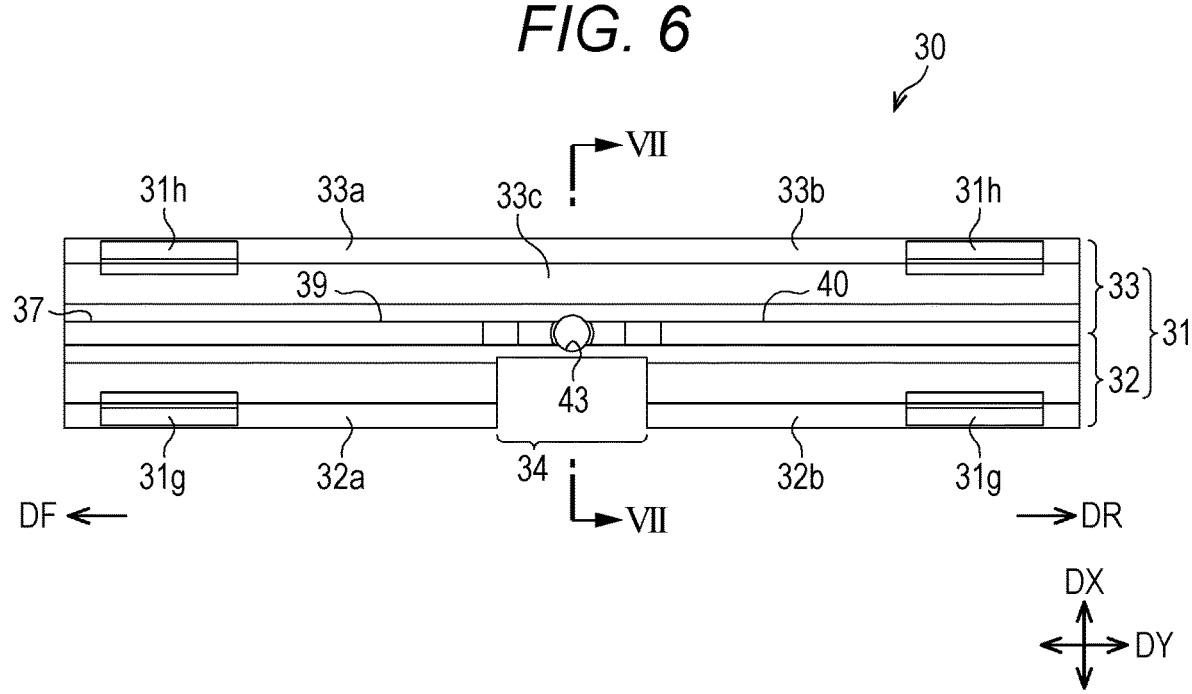
FIG. 6 is a plan view of the upper rail.

As illustrated in FIG. 6, the body portion 31 extends in the front-rear direction DY. The body portion 31 is sectioned into the first portion 32 and the second portion 33 in the width direction DX. The body portion 31 has the recess 34 at the central position in the front-rear direction DY. The first portion 32 is sectioned into the front part 32a and the rear part 32b, the recess 34 providing the boundary. The second portion 33 is sectioned into the front part 33a and the rear part 33b bounded by a central portion 33c, which is adjacent to the recess 34, in the front-rear direction DY. The recess 34 is configured as a cutout portion of the body portion 31.

Figure 7:
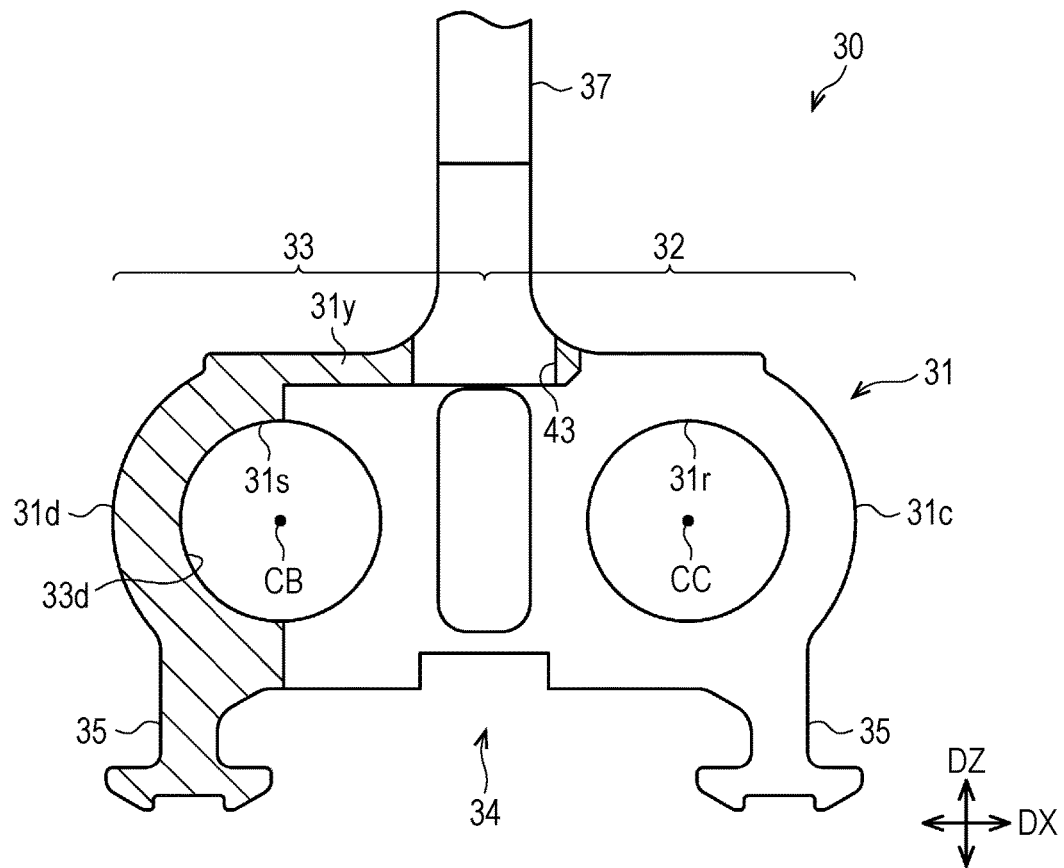
FIG. 7 is a cross-sectional view taken along line VII-VII of FIG. 6.

As illustrated in FIG. 7, the recess 34 extends in the width direction DX over a range from a side surface 31c on the first portion 32 side to a central axis line CB of the through-hole 31s of the second portion 33. An inner recess 33d is provided on the inside of the central portion 33c of the second portion 33. The inner recess 33d and the recess 34 constitute a space in which a second case 65 is disposed, as will be described later. The inner recess 33d is formed by cutting out the walls constituting the through-hole 31s during formation of the recess 34. In the recess 34 of the upper rail 30, the second case 65 is attached, as will be described later. The nut 51 is accommodated in the second case 65. In a state in which the upper rail 30 is arranged inside the lower rail 10, the nut 51 is disposed in the recess 34 of the upper rail 30 (see FIG. 10).

In the front part 32a and the rear part 32b of the first portion 32 of the body portion 31, the passing holes 31r are provided extending in the front-rear direction DY. The two passing holes 31r have a common central axis line CC. The screw 50 is passed through the passing hole 31r of the front part 32a and the passing hole 31r of the rear part 32b (see FIG. 10).

The vertical wall portion 37 of the upper rail 30 is provided so as to extend from an upper part 31y of the body portion 31 in the vertical direction DZ. In a state in which the body portion 31 of the upper rail 30 is arranged inside the lower rail 10, the vertical wall portion 37 extends through the communicating portion 14 and protrudes out of the communicating portion 14 to the outside of the lower rail 10.

Figure 8:
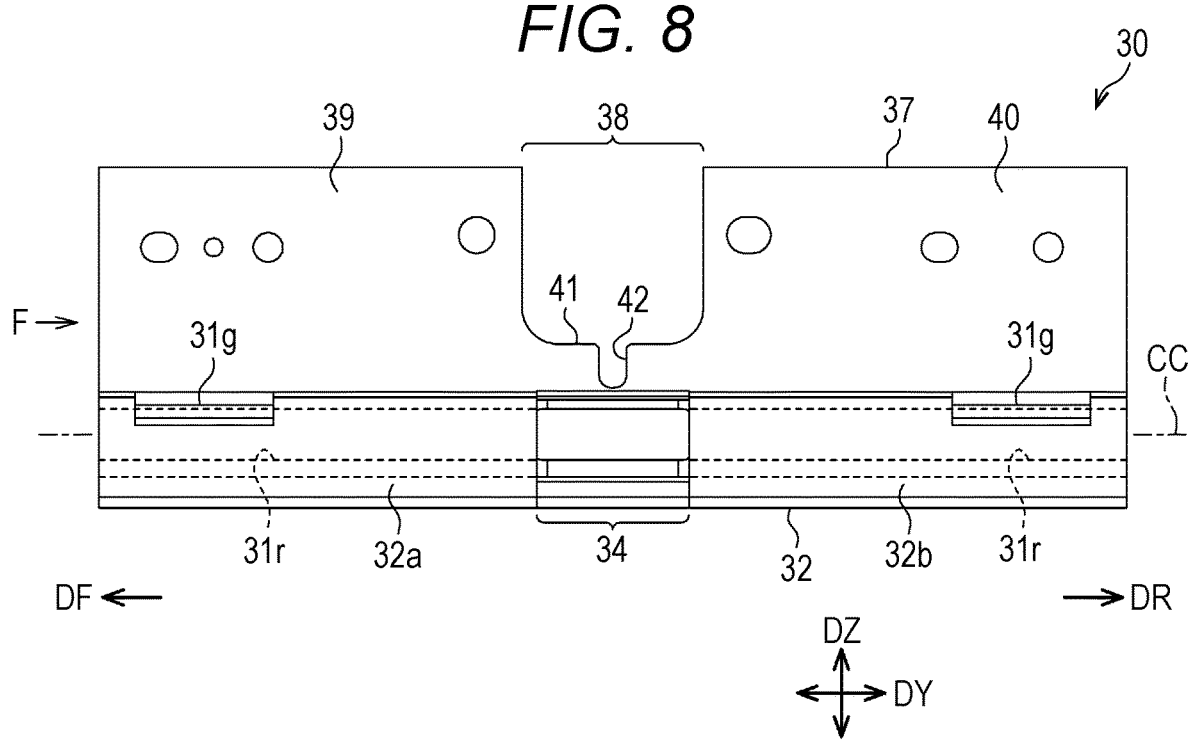
FIG. 8 is a side view of the upper rail.

As illustrated in FIG. 8, the vertical wall portion 37 extends in the front-rear direction DY. A vertically extending cutout portion 38 is provided at the center in the front-rear direction DY of the vertical wall portion 37. The vertical wall portion 37 is sectioned into a front vertical wall 39 and a rear vertical wall 40 bounded by the cutout portion 38. The front vertical wall 39 and the rear vertical wall 40 are connected by a link portion 41. The link portion 41 is disposed between the body portion 31 and the cutout portion 38. The link portion 41 has a recess 42 which is recessed downward. The link portion 41 (and the recess 42) has a through-hole 43 penetrating through the link portion 41 in the vertical direction DZ. A shaft member 73 of the drive device 60 rotates through the through-hole 43 (see FIG. 12).

Figure 9:
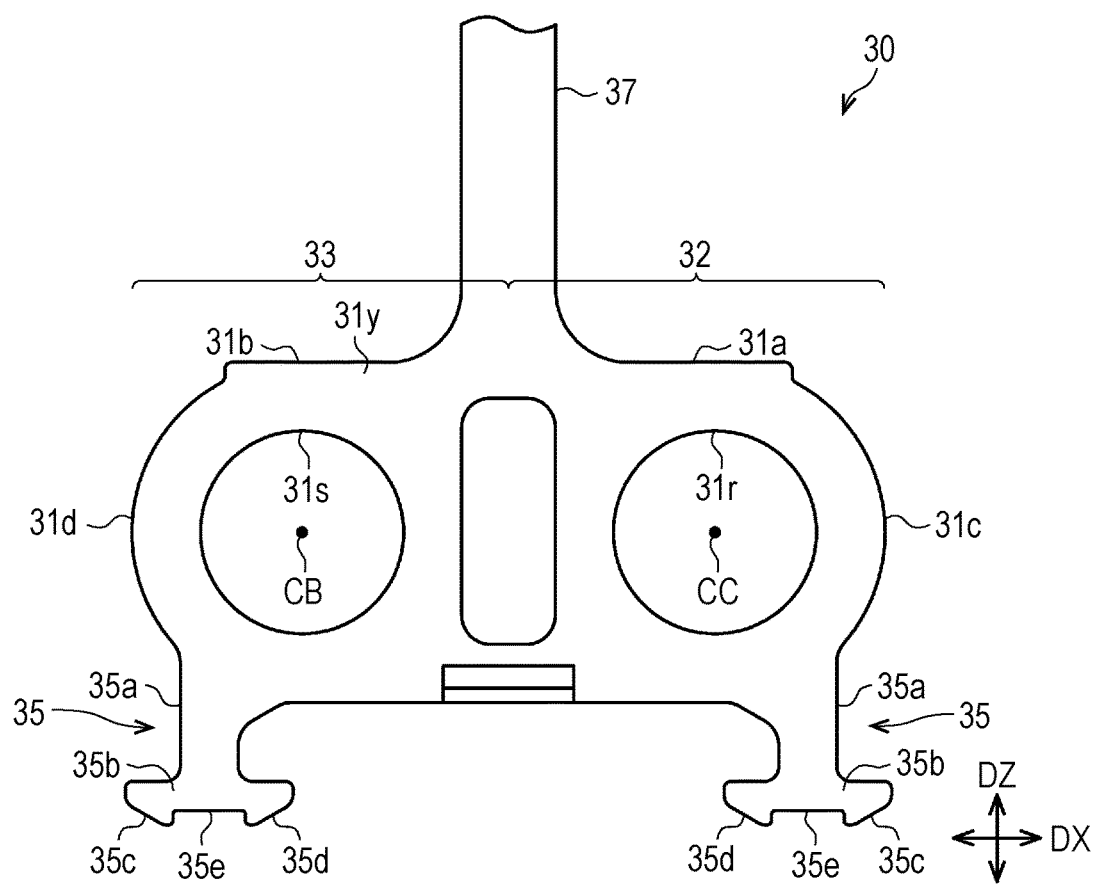
FIG. 9 is a front view as viewed from an arrow F in FIG. 8.

As illustrated in FIG. 9, the support portions 35 of the upper rail 30 are provided on the lower part of the body portion 31. Preferably, the upper rail 30 has two support portions 35. The two support portions 35 are arranged in the width direction DX. The support portions 35 extend in the front-rear direction DY. The support portions 35 include lower protrusions 35a extending downward from the body portion 31, and bottom plate portions 35b provided at the lower ends of the lower protrusions 35a.

The bottom plate portions 35b include first protrusions 35c and second protrusions 35d. The first protrusions 35c extend from the lower protrusions 35a along the width direction DX toward the side walls 12 of the lower rail 10. The second protrusions 35d extend from the lower protrusions 35a along the width direction DX toward the center of the lower rail 10. The lower slide members 47 are provided on lower surfaces 35e of the bottom plate portions 35b (see FIG. 11). The lower slide members 47 are formed from rubber or resin.

The body portion 31, the vertical wall portion 37, and the support portions 35 are integrally molded. For example, the upper rail 30 is formed by subjecting an extruded article of aluminum or aluminum alloy to a cutting process.

Preferably, the upper rail 30 includes the slide members 46. The slide members 46 are attached to the body portion 31. The slide members 46 are opposed to the side walls 12 and upper walls 13 of the lower rail 10 in a slidably contacted manner. The slide members 46 are provided at a boundary portion between an upper surface 31a of the body portion 31 and the side surface 31c, and a boundary portion between an upper surface 31b of the body portion 31 and the side surface 31d. For example, the slide members 46 are attached in a recess 31g provided at the boundary portion between the upper surface 31a of the upper rail 30 and the side surface 31c, and in a recess 31h provided at the boundary portion between the upper surface 31b of the upper rail 30 and the side surface 31d (see FIG. 11).

Figure 10:
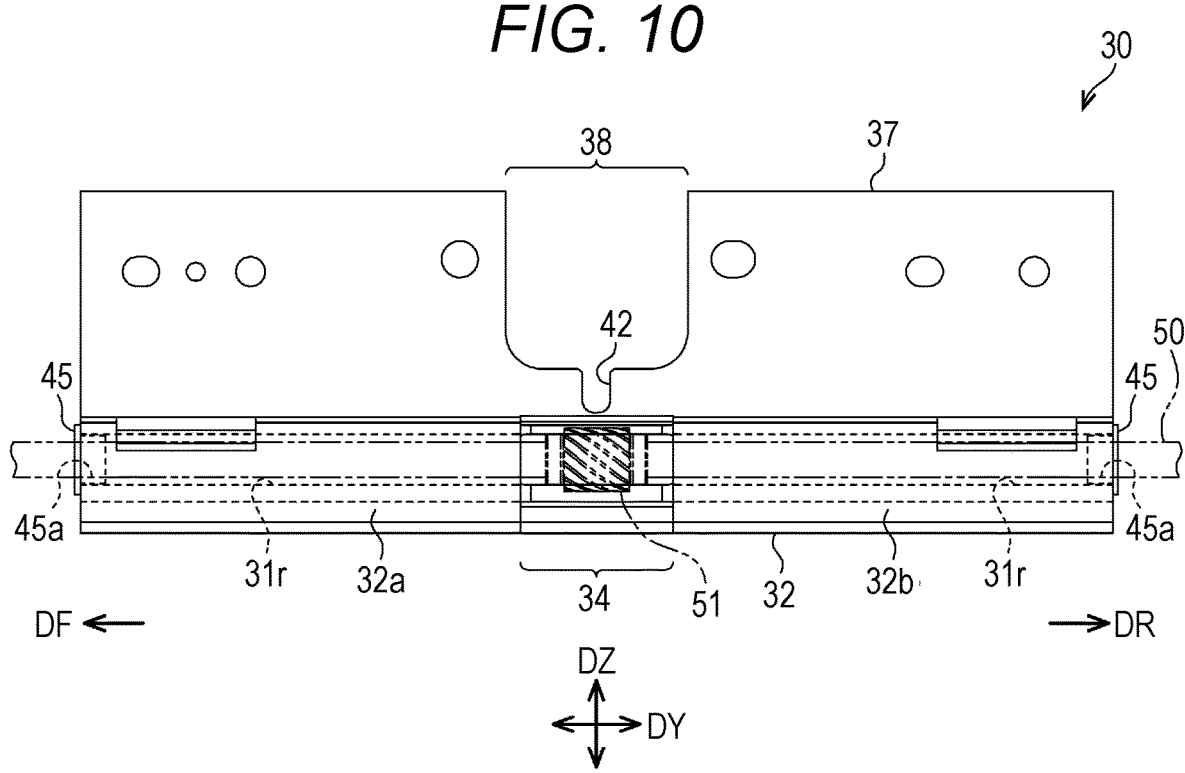
FIG. 10 illustrates the relationship between the screw and the upper rail.

As illustrated in FIG. 10, preferably, the upper rail 30 includes vibration suppression members 45. The vibration suppression members 45 have passing holes 45a for passing the screw 50. The vibration suppression members 45 are disposed such that inner peripheral surfaces of the passing holes 45a can abut on the screw 50. For example, the vibration suppression members 45 are positioned with the nut 51 disposed therebetween in the front-rear direction DY. Specifically, the vibration suppression members 45 are disposed respectively at the front end of the passing hole 31r on the front side of the upper rail 30 and the rear end of the passing hole 31r on the rear side of the upper rail 30.

Figure 11:
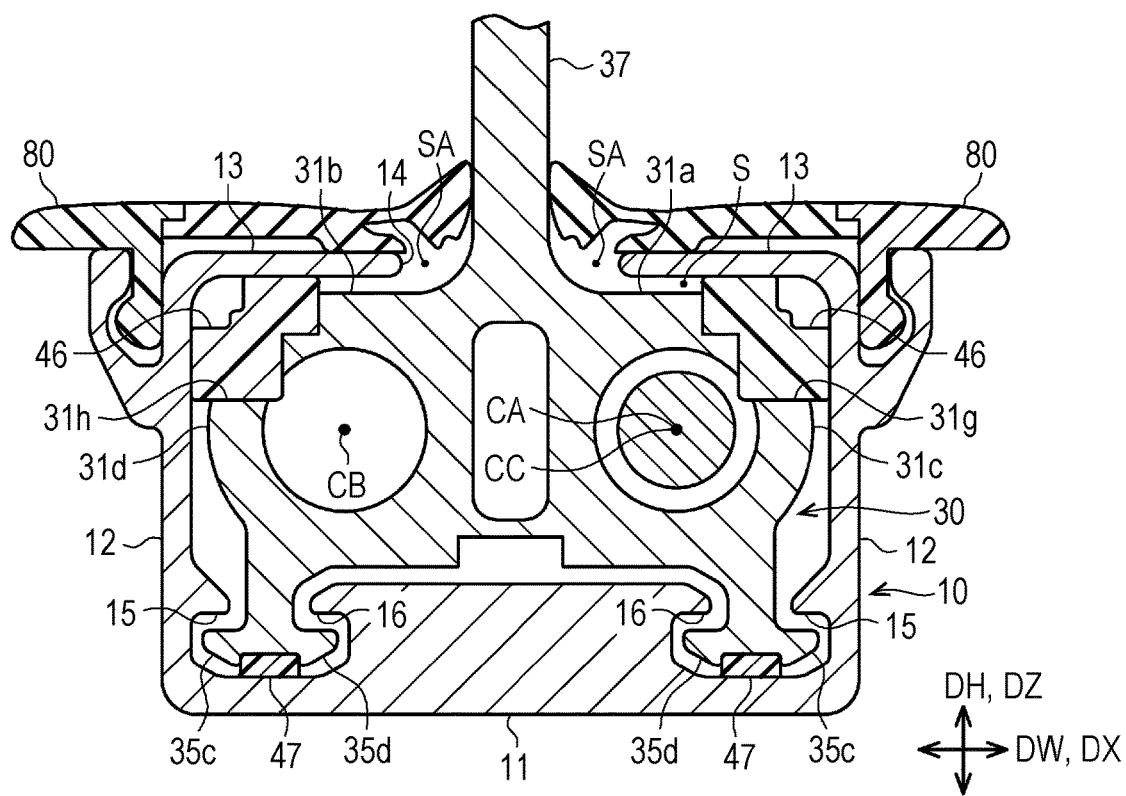
FIG. 11 is a cross-sectional view taken along line XI-XI of FIG. 2.

Referring to FIG. 11, the slide structure of the upper rail 30 will be described.

The upper rail 30 has four slide members 46. Two of the slide members 46 are respectively provided on the front side and the rear side of the first portion 32 of the body portion 31. The other two slide members 46 are respectively provided on the front side and the rear side of the second portion 33 of the body portion 31. The slide members 46 are arranged so as to be able to contact the upper walls 13 and side walls 12 of the lower rail 10. The lower slide members 47, as described above, are provided on the lower surfaces 35e of the bottom plate portions 35b. The lower slide members 47 contact the bottom wall 11. Thus, the upper rail 30 is opposed to the lower rail 10 in a contactable manner in both the vertical direction DZ and the width direction DX.

Referring to FIG. 11, the arrangement relationship between the first protrusions 35c and second protrusions 35d of the upper rail 30 and the first regulating portions 15 and second regulating portions 16 of the lower rail 10 will be described. In a state in which the upper rail 30 is arranged in the lower rail 10, the first protrusions 35c are disposed between the first regulating portions 15 and bottom wall 11 of the lower rail 10. The second protrusions 35d are disposed between the second regulating portions 16 and bottom wall 11 of the lower rail 10.

Referring to FIG. 3 and FIG. 12 to FIG. 15, the drive device 60 will be described.

The drive device 60 causes the nut 51 to rotate. The drive device 60, by causing the nut 51 to rotate, causes the upper rail 30 to be moved in the front-rear direction DY with respect to the lower rail 10. The drive device 60 is mounted to the upper rail 30.

As illustrated in FIG. 3, the drive device 60 includes a motor 61, a bracket 62, a power transmission mechanism 63, a first case 64, and a second case 65.

Figure 12:
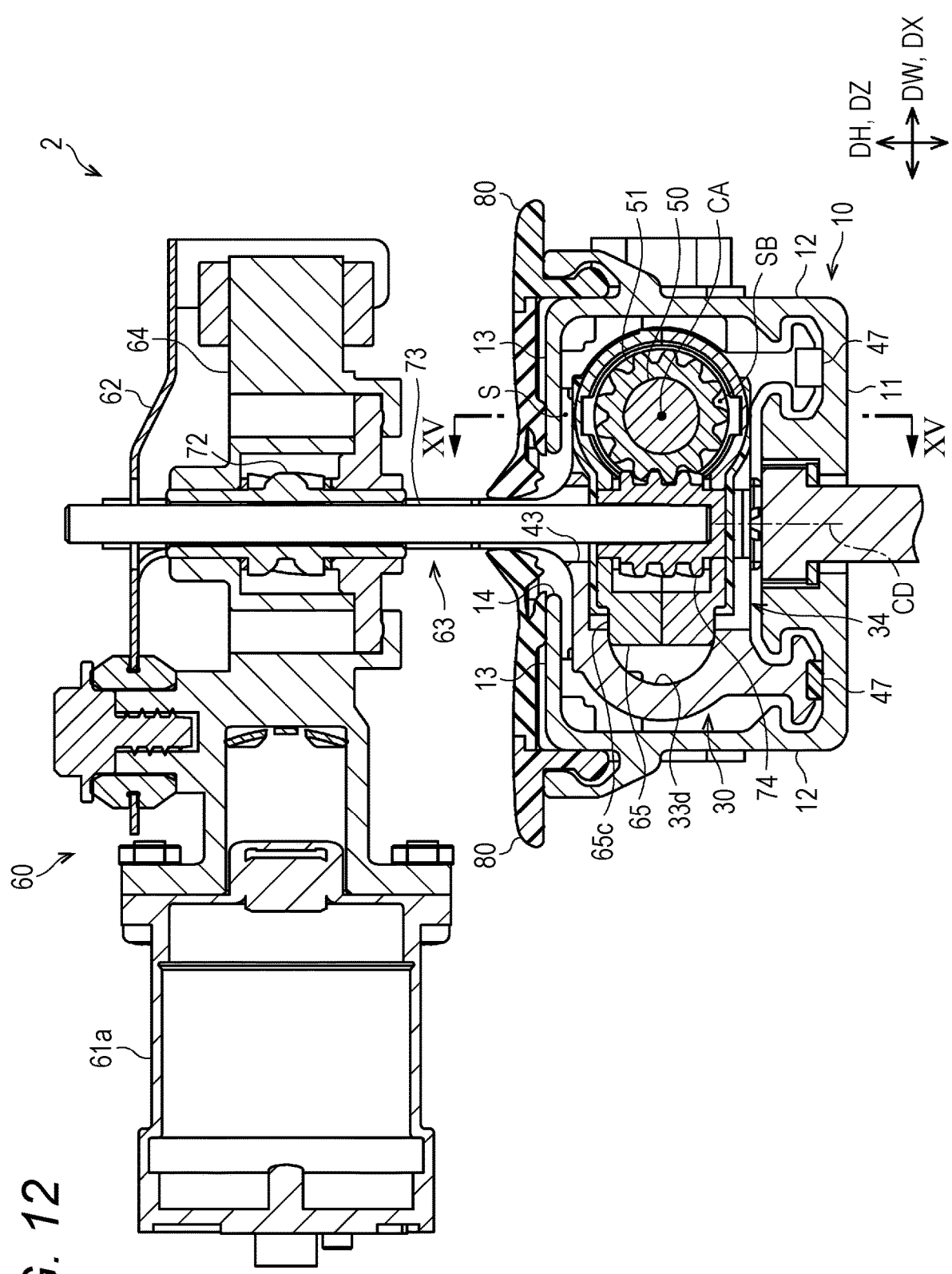
FIG. 12 is a cross-sectional view taken along line XII-XII of FIG. 2.

As illustrated in FIG. 12, the power transmission mechanism 63 includes a worm gear 71, a first helical gear 72, the shaft member 73, and a second helical gear 74. The worm gear 71 is attached to the end of an output shaft 70 of the motor 61 (see FIG. 3).

The first helical gear 72 is attached to the upper end of the shaft member 73. The first helical gear 72 meshes with the worm gear 71. The second helical gear 74 is attached to the lower end of the shaft member 73. The second helical gear 74 meshes with an outer peripheral surface of the nut 51. The second helical gear 74 rotates and thereby causes the nut 51 to rotate due to the rotation of the second helical gear 74 . . . . The nut 51 and the second helical gear 74 are arranged in the width direction DW.

The output shaft 70 of the motor 61 extends so as to intersect the side surface of the vertical wall portion 37. The worm gear 71 attached to the output shaft 70 is disposed in the cutout portion 38 of the vertical wall portion 37. The shaft member 73 is passed through the through-hole 43 provided in the link portion 41 on the lower side of the cutout portion 38. The first helical gear 72 provided at the upper end of the shaft member 73 meshes with the worm gear 71 over the cutout portion 38. The lower end of the shaft member 73 is positioned in the recess 34 of the upper rail 30. The second helical gear 74 provided at the lower end of the shaft member 73 meshes with the nut 51.

The first case 64, in a state in which a part of the output shaft 70, the worm gear 71, and the first helical gear 72 are accommodated therein, is attached inside the cutout portion 38 of the vertical wall portion 37 by the bracket 62. The motor 61 is fixed to an end of the first case 64. As the first case 64 is attached in the cutout portion 38 of the vertical wall portion 37, the motor 61 is attached in the cutout portion 38, although in FIG. 12, only the motor case 61a is displayed. The second case 65 accommodates the second helical gear 74 and the nut 51. The second case 65 has an opening 65p for passing the screw 50 (see FIG. 13). The opening 65p is continuous with an accommodating space SB in the second case 65.

Figure 13:
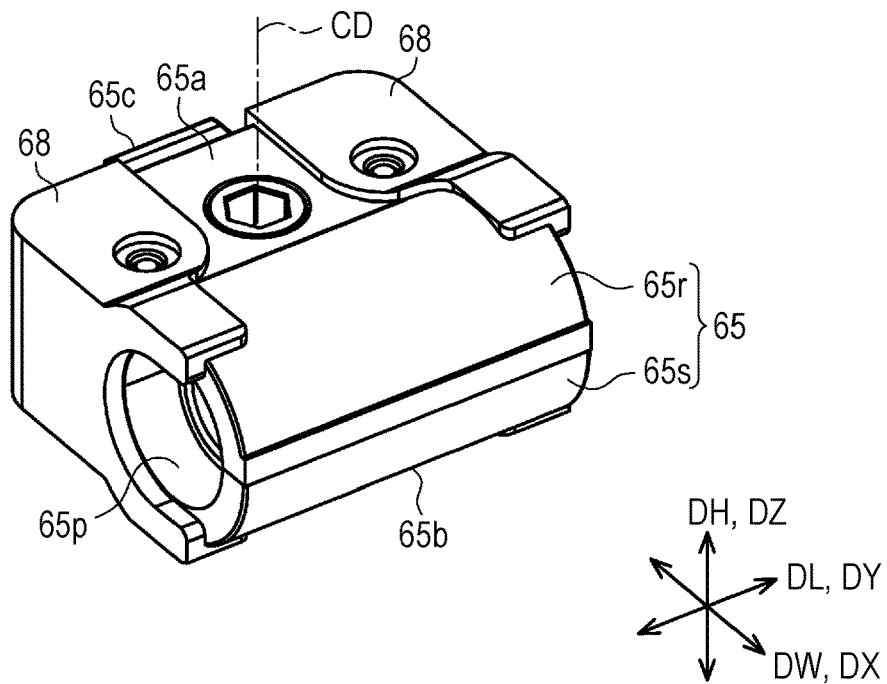
FIG. 13 is a perspective view of a second case.

As illustrated in FIG. 13, the second case 65 includes a case body portion 65a and a nut cover portion 65b covering the nut 51. The case body portion 65a of the second case 65 has a projection 65c. The projection 65c is disposed on the side of the case body portion 65a opposite to where the nut cover portion 65b is provided in the width direction DX. The case body portion 65a of the second case 65 retains the second helical gear 74 in a rotatable manner so that a central axis line CD of the second helical gear 74 is aligned with the vertical direction DZ. The second case 65 includes two case split bodies 65r and 65s which are split vertically.

Figure 14:
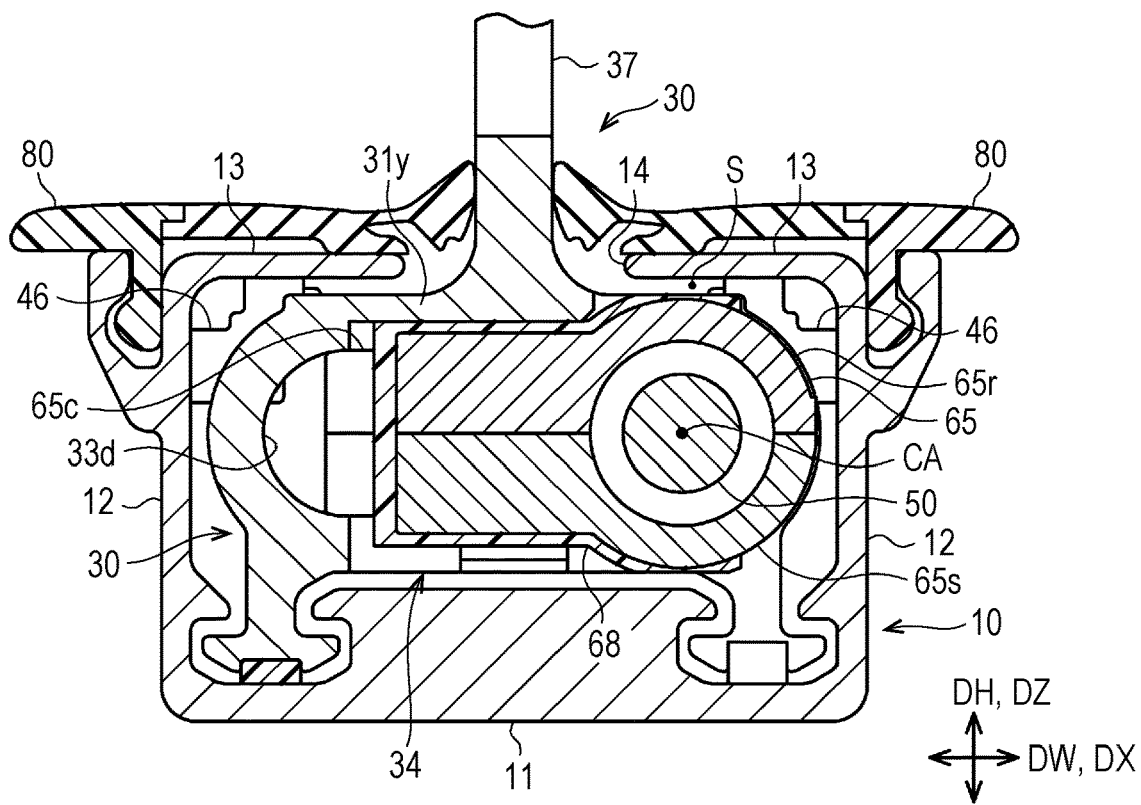
FIG. 14 is a cross-sectional view taken along line XIV-XIV of FIG. 2.

As illustrated in FIG. 12, the second case 65, in a state in which the second helical gear 74 and the nut 51 are accommodated therein, is disposed in the recess 34 of the body portion 31 of the upper rail 30. In other words, the drive mechanism including the second helical gear 74 and the nut 51 is disposed in the space between the upper walls 13 and second regulating portions 16 of the lower rail 10. When the second case 65 is disposed in the recess 34 of the upper rail 30, the projection 65c of the second case 65 engages the inner recess 33d in the upper rail 30. As illustrated in FIG. 13, buffer members 68 are attached to the front end and rear end of the second case 65. As illustrated in FIG. 14, the buffer members 68 are sandwiched between the upper part 31y of the upper rail 30 and the second case 65.

Figure 15:
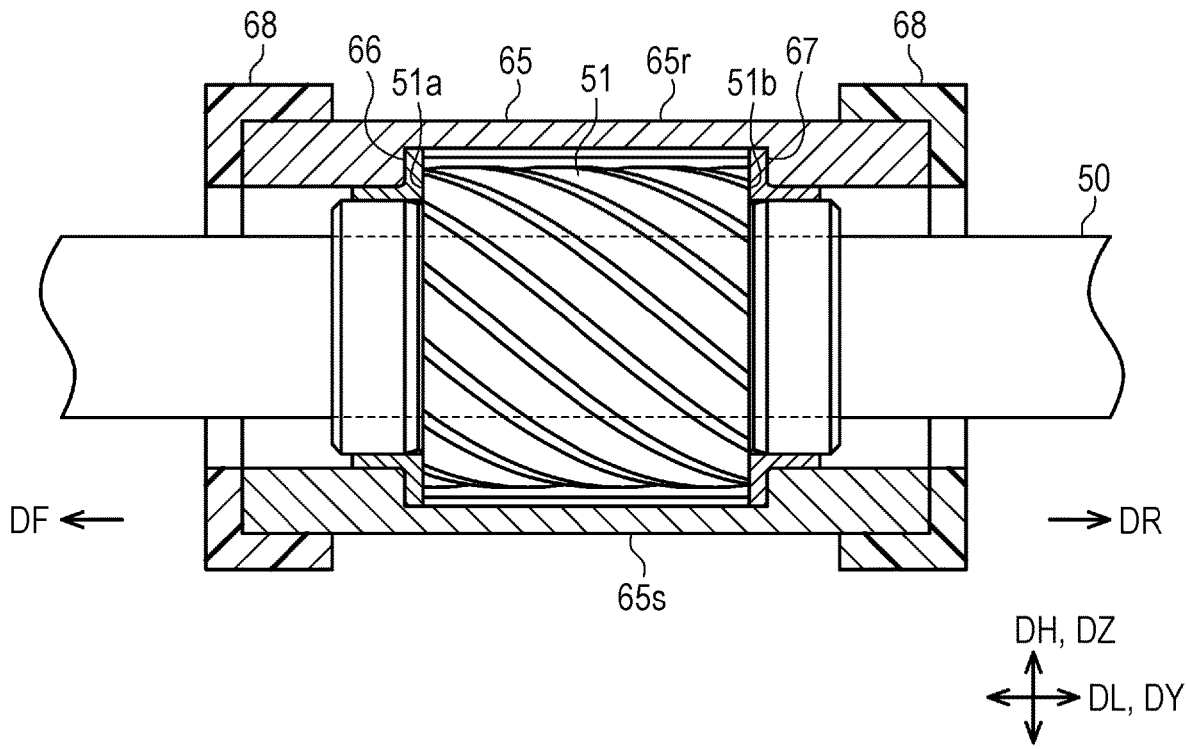
FIG. 15 is a schematic cross-sectional view taken along line XV-XV of FIG. 12.

Referring to FIG. 3, FIG. 14, and FIG. 15, the relationship between the screw 50, the nut 51, and the second case 65 will be described.

The screw 50 extends along the longitudinal direction DL of the lower rail 10. The screw 50 is attached to the side walls 12 of the lower rail 10. Specifically, both ends of the screw 50 are attached to the side walls 12 by attachment members 52 in a substantially non-rotatable manner. The central axis line CA of the screw 50 is disposed in a space S enclosed by the bottom wall 11, the side walls 12, and the upper walls 13 of the lower rail 10. The space S enclosed by the bottom wall 11, side walls 12, and upper walls 13 includes the spaces between the upper walls 13 and the bottom wall 11 in the vertical direction DH, and does not include the space between the communicating portion 14 and the bottom wall 11 in the vertical direction DH.

The nut 51 is engaged (screwed) with the screw 50 in a rotatable manner. The screw 50 is passed through the hole in the nut 51. The nut 51, in a state of being engaged with the screw 50, is arranged in the recess 34 of the upper rail 30 and accommodated in the second case 65.

As illustrated in FIG. 15, a front-end surface 51a of the nut 51 contacts a front-side slide member 66 disposed on the front inner side of the second case 65. A rear end surface 51b of the nut 51 contacts a rear-side slide member 67 disposed on the rear inner side of the second case 65. The driving force of the nut 51 based on the rotation of the nut 51 is transmitted to the upper rail 30 by the contact between the nut 51 and the front-side slide member 66 of the second case 65, or by the contact between the nut 51 and the rear-side slide member 67 of the second case 65. As the nut 51 rotates due to the power of the drive device 60, the nut 51 moves with respect to the screw 50, and the upper rail 30 also moves.

The operation of the lower rail 10 of the present embodiment will be described. The lower rail 10 has the space S enclosed by the bottom wall 11, the side walls 12, and the upper walls 13, and the communicating portion 14 providing communication between the inside and outside of the lower rail 10. The central axis line CA of the screw 50 is disposed not under the communicating portion 14 but in the space S. That is, the screw 50 is disposed at a position facilitating attachment to any of the bottom wall 11, the side walls 12, and the upper walls 13. Accordingly, in this structure, the screw 50 can be attached to any of the bottom wall 11, the side walls 12, and the upper walls 13. The flexibility in attaching the screw 50 increases the design freedom of the lower rail 10.

The effects of the present embodiment will be described.

(1) In the slide device 2, the central axis line CA of the screw 50 is disposed in the space S enclosed by the bottom wall 11, side walls 12, and upper walls 13 of the lower rail 10. In the configuration, because the central axis line CA of the screw 50 is disposed in the space S enclosed by the bottom wall 11, the side walls 12, and the upper walls 13, it is possible to attach the screw 50 to any of the bottom wall 11, side wall 12, and upper walls 13. Accordingly, the freedom of attachment of the screw 50 is increased. As a result, the freedom of arrangement of components other than the screw 50 and the nut 51 is also increased. Thus, with the configuration, it is possible to increase the freedom of arrangement of components compared to a structure in which the attachment position of the screw 50 is substantially determined.

(2) In the slide device 2, the lower rail 10 has the screw 50, and the upper rail 30 has the nut 51. In this configuration, it is possible to make the upper rail 30 shorter than with a structure in which the screw 50 is attached to the upper rail 30.

(3) In the slide device 2, the screw 50 is attached to the side walls 12 of the lower rail 10. In this configuration, the screw attachment portions for attaching the screw 50 are provided on the side walls 12. Because the bottom wall 11 does not require the screw attachment portions, the design freedom of the bottom wall 11 is increased. For example, compared to a case in which the attachment members 52 for attaching the screw 50 are provided on the bottom wall 11, it is possible to increase the number of the fastening members 20 attached to the bottom wall 11.

(4) In the slide device 2, the upper rail 30 is in sliding contact with the bottom wall 11. In this configuration, the load of the seat 3 can be applied to the bottom wall 11 directly. This makes it possible to reduce the load applied to the side walls 12 of the lower rail 10. Thus, for example, it is possible to maintain the strength of the lower rail 10 even when the thickness of the side walls 12 of the lower rail 10 of the slide device 2 is reduced compared to the thickness of the side walls of a lower rail made on the assumption that the side walls would be subjected to the load directly. Herein, the strength means a bending strength when the lower rail 10 is subjected to a force in the vertical direction DH.

(5) In the slide device 2, the screw 50 is passed through the nut 51, and the nut 51 and the second helical gear 74 meshing with the nut 51 on the outside of the nut 51 are arranged in the width direction DW. In this configuration, because the nut 51 and the second helical gear 74 are arranged in the width direction DW, it is possible to reduce the dimension of the slide device 2 in the vertical direction DH.

(6) In the slide device 2, the nut 51 and the second helical gear 74 are arranged in the second case 65, and the second case 65 is attached to the upper rail 30. Thus, the position of the second case 65 is stabilized, and therefore the sliding of the upper rail 30 is stabilized.

(7) The buffer members 68 are disposed between the second case 65 and the upper rail 30. Accordingly, vibration of the second case 65 due to the movement of the upper rail 30 in the front-rear direction DY is absorbed by the buffer members 68, making generation of noise less likely.

Other Embodiments

The present disclosure is not limited to the foregoing embodiment, which has been described merely by way of example. For example, the embodiment may be modified as follows. In the following modification, configurations having no substantial changes from those of the embodiment will be described using reference signs similar to those of the configurations of the embodiment.

In the foregoing embodiment, rotating power is applied to the nut 51. Instead, rotating power may be applied to the screw 50. The nut 51 is fixed to the upper rail 30 in a substantially non-rotatable manner. In this case, the drive device 60 is attached to the lower rail 10 or the vehicle.

The rotating power may be applied to the nut 51 and the screw 50. In this case, the direction of the rotating power applied to the nut 51 is opposite to the direction of the rotating power applied to the screw 50. In this configuration, it is possible to increase the moving speed of the nut 51.

Figure 16:
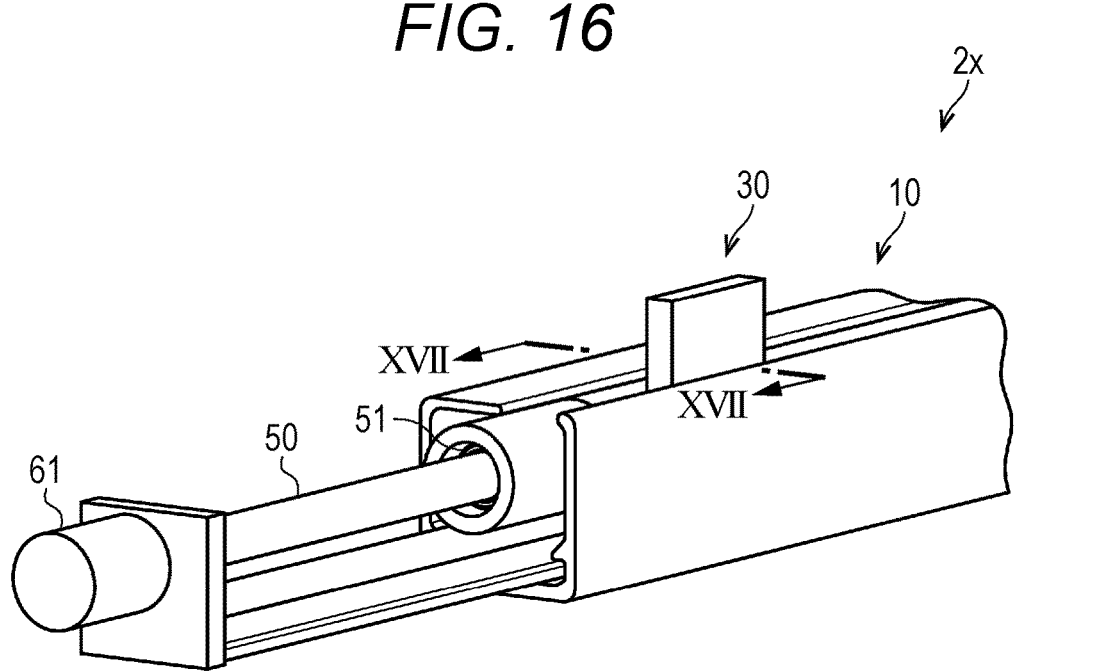
FIG. 16 is a perspective view of a modification of the slide device.
Figure 17:
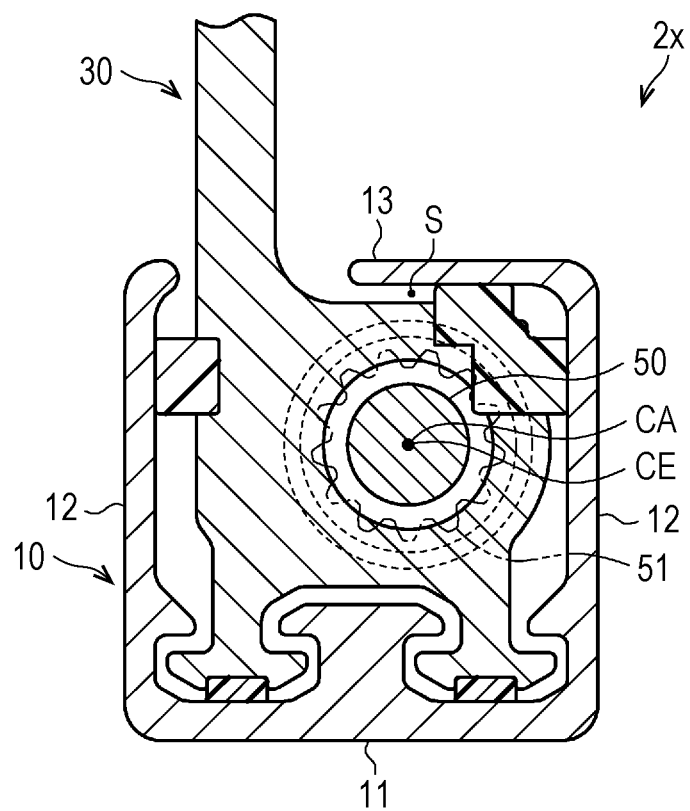
FIG. 17 is a cross-sectional view taken along line XVII-XVII of FIG. 16.

Referring to FIG. 16 and FIG. 17, a slide device 2x according to the modification will be described. In the foregoing embodiment, the screw 50 is attached to the lower rail 10, and the nut 51 is attached to the upper rail 30. In contrast, in the slide device 2x illustrated in FIG. 16 and FIG. 17, the nut 51 is attached to the lower rail 10, and the screw 50 is attached to the upper rail 30. The screw 50 is rotated by the motor 61. The nut 51 is retained on the lower rail 10 in a substantially non-rotatable manner. In this example, preferably, the central axis line CE of the nut 51 is disposed in the space S enclosed by the bottom wall 11, side walls 12, and upper wall 13 of the lower rail 10.

In this configuration, the central axis line CE of the nut 51 is disposed in the space S enclosed by the bottom wall 11, side walls 12, and upper wall 13. Accordingly, it is possible to have the nut 51 retained on any of the bottom wall 11, the side wall 12, and the upper wall 13. Or, the nut 51 can be retained on any of the bottom wall 11, the side walls 12, and the upper wall 13 easily. Thus, in this configuration, it is possible to increase the freedom with respect to the retained position of the nut 51. As a result, compared to a structure in which the retained position of the nut 51 is substantially determined, the freedom of arrangement of components can be increased.

In the modification illustrated in FIG. 16 and FIG. 17, rotating power is applied to the screw 50. Instead, the screw 50 may be fixed to the upper rail 30 in a substantially non-rotatable manner, and rotating power may be applied to the nut 51. Alternatively, rotating power may be applied to the nut 51 and the screw 50.

In the foregoing embodiment, the motor 61 is attached to each of a pair of slide devices 2. In contrast, only one motor 61 may be provided for the seat slide apparatus 1. In this case, the power of the motor 61 is transmitted via a power transmission mechanism to the nuts 51 or screws 50 of the pair of slide devices 2.

In the embodiment, the lower rail 10 has a pair of upper walls 13. However, the configuration of the lower rail 10 is not limited to the embodiment. For example, as illustrated in FIG. 17, the lower rail 10 may have one upper wall 13.

In the embodiment, the bottom wall 11, side walls 12, and upper walls 13 of the lower rail 10 are integrally molded. However, the configuration of the lower rail 10 is not limited to the embodiment. For example, the bottom wall 11 and the side walls 12 may be integrally molded, whereas the upper walls 13 may be molded as a separate component. In this case, the upper walls 13 may be attached to the side walls 12.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A slide device comprising:
a lower rail;
an upper rail disposed movably with respect to the lower rail;
a screw provided on one of the lower rail and the upper rail; and
a nut provided on the other one of the lower rail and the upper rail, and engaging the screw,
wherein
the upper rail moves relatively with respect to the lower rail in accordance with rotation of at least one of the screw and the nut,
the lower rail includes a bottom wall, a side wall extending upward from the bottom wall, and an upper wall extending toward the center in a width direction from the side wall,
the screw or the nut provided on the lower rail has a central axis line which is disposed in a space enclosed by the bottom wall, the side wall, and the upper wall of the lower rail, and
when viewed in a direction from an upper wall side of the lower rail toward the bottom wall, the central axis line of the screw or the nut is behind the upper wall.

2. The slide device according to claim 1, wherein
the screw is provided on the lower rail, and
the nut is provided on the upper rail.

3. The slide device according to claim 2, wherein the screw is attached to the side wall of the lower rail.

4. The slide device according to claim 1, wherein
the screw is passed through the nut, and
the nut and a gear meshing with the nut on the outside of the nut are arranged in the width direction.

5. The slide device according to claim 4, wherein:
the screw is provided on the lower rail,
the nut is provided on the upper rail,
the nut and the gear are arranged in a case, and
the case is attached to the upper rail.

6. The slide device according to claim 5, further comprising a buffer member arranged between the case and the upper rail.

* * * * *